US011863597B1

(12) United States Patent
Gosztyla et al.

(10) Patent No.: US 11,863,597 B1
(45) Date of Patent: Jan. 2, 2024

(54) REMOTE RESCUE SYSTEM, DEVICE AND METHOD FOR ACCIDENTS AND EVENTS DURING VIDEO MEETINGS

(71) Applicant: MOTOROLA SOLUTIONS, INC., Chicago, IL (US)

(72) Inventors: Grzegorz Gosztyla, Cracow (PL); Jaroslaw Karbowski, Cracow (PL); Mateusz Biernacki, Cracow (PL); Marcin Kucharzyk, Cracow (PL); Filip Norys, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/888,931

(22) Filed: Aug. 16, 2022

(51) Int. Cl.
*H04L 65/1093* (2022.01)
*H04L 65/403* (2022.01)
*H04L 65/1096* (2022.01)
*H04M 3/54* (2006.01)
*H04M 3/42* (2006.01)

(52) U.S. Cl.
CPC ...... *H04L 65/1093* (2013.01); *H04L 65/1096* (2013.01); *H04L 65/403* (2013.01); *H04M 3/42348* (2013.01); *H04M 3/54* (2013.01); *H04M 2201/42* (2013.01); *H04M 2242/04* (2013.01)

(58) Field of Classification Search
CPC .......... H04L 65/1093; H04L 65/1096; H04L 65/403; H04M 3/42348; H04M 3/54; H04M 2201/42; H04M 2242/04
See application file for complete search history.

(56) References Cited

U.S. PATENT DOCUMENTS

| 2009/0191840 | A1  | 7/2009  | Piett et al. |
| 2010/0262668 | A1  | 10/2010 | Piett et al. |
| 2016/0300078 | A1  | 10/2016 | Wooldridge |
| 2017/0310827 | A1* | 10/2017 | Mehta .................. H04M 11/04 |

(Continued)

FOREIGN PATENT DOCUMENTS

CN          104255007 A       12/2014

OTHER PUBLICATIONS

Zoom Emergency Protocols, : https://cusafelyback.chapman.edu/wp-content/uploads/2021/02/Zoom-Teams-Emergency-Protocols.pdf (and attached) published Feb. 9, 2021.

(Continued)

*Primary Examiner* — Phung-Hoang J Nguyen
(74) *Attorney, Agent, or Firm* — PERRY + CURRIER (57) ABSTRACT

A system for alerting an emergency responder that an emergency has occurred during a video communication between two or more participants, including: a trusted custodian computer system that receives emergency information from (and then generates unique tokens for) the participants of a video communication. A second participant who has witnessed a first participant have an emergency during the video communication transmits the first participant's unique token to a first responder who then transmits the unique token to the trusted custodian computer system. The trusted custodian computer system then determines when the first responder is both capable of and permitted to respond to the emergency, or locates another appropriate first responder that is capable of and permitted to respond to the emergency.

21 Claims, 4 Drawing Sheets

(56) References Cited

U.S. PATENT DOCUMENTS

2018/0084100 A1* 3/2018 Chockalingam .. H04M 1/72424
2018/0352085 A1* 12/2018 Philbin ................. H04L 67/146
2020/0100084 A1* 3/2020 Martin .................... H04W 4/90
2022/0036721 A1* 2/2022 Wu ....................... G08B 27/001

OTHER PUBLICATIONS

Gartner Research, What to do When a Medical Emergency Occurs in a Virtual Meeting, lhttps://www.gartner.com/en/documents/4003846; Published: Jul. 21, 2021.

ADR (Additional Data Repository)—NENA Knowledge Base, https://nenawiki.org/wiki/ADR_(Additional_Data_Repository), published May 24, 2022.

* cited by examiner

FIG. 4

REMOTE RESCUE SYSTEM, DEVICE AND METHOD FOR ACCIDENTS AND EVENTS DURING VIDEO MEETINGS

BACKGROUND

Videoconferencing has experienced recent explosive growth, especially with the advent of Covid-19. People worldwide are now using videoconferencing to talk to co-workers, located in distant offices, and family around the world. Videoconferencing has allowed people to feel as if their co-workers, friends and family are sitting next door or in the next office. Unfortunately, should one of the participants on a video call have a medical (or other type of) emergency during the call, there is no easy way for the other video call participants to alert the necessary authorities/first responders.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 is a flow chart illustrating a method according to the present rescue system for accidents and events during video meetings Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Videoconferencing has experienced recent explosive growth, especially with the advent of Covid-19. Unfortunately, should one of a participant on a video call have a medical (or other type of) emergency during the call, there is no easy way for the other video call participants to alert the necessary authorities/first responders. Thus, there exists a need for an improved technical method, device, and system for implementing remote rescue for accidents and events during video meetings.

The present remote rescue system permits video call participants to alert the necessary authorities/first responders (police, ambulance, fire, security company, etc.) should one of the participants on a video call have a medical (or other type of) emergency during the call. This may optionally be accomplished even though the other participants in the video call typically do not know the exact location of the participant victim, or even when the participant victim having the emergency is using a fake or blurred background or using an avatar.

The present system provides a reliable and easy to operate system for the participants in the video call to locate and send first responders (police, ambulance, fire, security company, etc.) to the location of participant in the call who is experiencing an emergency.

In addition, the present system also protects the privacy of both the victim participant and the other participants on the video call. For example, it would not be desirable for each of the participants on the call to simply be required to share their exact locations with one another at all times. Rather, as will be shown herein, the locations of the participants on the call should be kept confidential and only the location of the victim participant be shared with appropriate first responders when an actual emergency occurs. As a result, the present system addresses these concerns and provides a secure and easy to use system that maintains confidentiality for all parties.

Additionally, the present system may locate and notify an appropriate first responder across various jurisdictions (and across different nations), to alert the most appropriate first responder in the actual geographical location of the victim. This is because even when the participants on the video call knew the exact locations of the other participants' exact locations, it had previously been very difficult to alert the first responders in another city or country. For example, during a family video call, one member of the family may be located across the country. Simply knowing that person's address would not be sufficient in alerting police, fire or ambulance services in the victim's city and country. This is because emergency "911" calls are handled locally. There is simply no easy way to call 911 for a person in another city across the country. As will be shown, the present system addresses and overcomes these concerns.

In summary, the present system enables participants on a video communication to quickly and easily send a first responder (who may be a police officer, a fire fighter, an emergency medical technician, a security company employee, other emergency personnel, etc.) to the location of one of the participants on the call should that participant be experiencing an emergency. For example, should one of the participants on the call have a heart attack, one of the other participants could trigger the present emergency rescue system that would send an ambulance. Similarly, should one of the participants on the video call experience a building fire, the other participants on the call could trigger the present rescue system to send a fire truck.

One advantage of the present system is that the participants on the video call do not have to share their locations (medical conditions or critical emergency data) with one another. As such, each of the participants on the video call are able to maintain their own privacy.

Another advantage of the present system is that it selects a first responder who is appropriate to respond to the emergency. As understood herein, an "appropriate" first responder is one who is both capable of responding to the emergency and permitted by the victim to respond to the emergency. For example, a "capable" first responder for a video call participant suffering a heart attack would be an ambulance service in the same geographic area as the heart attack victim. A "capable" first responder for responding to a fire would be a fire department. A "capable" first responder for responding to a crime would be a police department, etc. One acceptable definition of "capable" of responding as used herein would be "legally authorized" to respond. A "permitted" first responder would be a first responder that the victim has in effect pre-approved by the victim participant to respond. For example, the victim participant may have configured their system preferences such that local police are called for law enforcement emergencies in Poland or the US (if the victim's location is in Poland or the US at the time), but local police may not be called for law enforcement emergencies in Russia (if the victim's location is in Russia). Further details of these victim participant preferences will be explained in more detail here below.

Furthermore, herein when an action is described as being performed by a participant in a video communication, and the like, it is understood that such actions are performed via a communication device, and/or any other suitable computing device, associated with such a participant, and the like. Hence, actions described herein are understood to be technical in nature, and implemented by an appropriate device.

In various aspects as will be explained in more detail with reference to the figures below, the present system provides a system for alerting a first/emergency responder that an emergency has occurred during a video communication between two or more participants, the system comprising: (a) a trusted custodian computer system, comprising: (i) a first computing device configured to receive emergency information from at least a first participant in a video communication prior to commencement of the video communication, (ii) a second computing device configured to generate a unique token corresponding to the received emergency information and to assign the unique token to the first participant prior to commencement of the video communication, (iii) a third computing device configured to determine when a first responder presenting the unique token to the trusted custodian computer system is both capable of responding to the emergency and has been permitted by the first participant to respond to the emergency, (iv) a fourth computing device configured to grant access to the emergency information to a first responder computer system associated with the first responder when the first responder has first been determined (by the trusted custodian computer system) to be both capable of responding to the emergency and permitted to respond to the emergency; and a fifth computing device comprising a video communication system configured to permit a second participant who has witnessed the first participant have the emergency through the video communication transmit the first participant's unique token via a network to the first responder computer system associated with the first responder, wherein the second participant may not access the first participant's emergency information from the unique token.

In various aspects, some, most or all of the participants may have unique tokens assigned for the video call. As such, the different participants to the video communication may use the present system to monitor one another. Should one of the participants on the call have an emergency, the other participant(s) may immediately send the distressed participant's token to the first responder corresponding to the alerting participant(s). The notified first responder may then present the distressed participant's token to the trusted custodian computer system. The trusted custodian computer system may then determine which first responder is both capable and permitted to respond to the emergency.

One advantage of the present system is that the local first responder who is first notified by the alerting participant to the emergency may be the first responder best suited to respond. However, should the distressed participant and the alerting participant be in different cities or countries, the present system may instead locate the first responder best suited to respond (e.g.: the first responder in the victim's city and country). In various aspects, the present trusted custodian computer system determines who the most appropriate first responder is based on the first responder being in the same geographic area or jurisdiction (city, county, country) as the victim participant. These decisions are made in conjunction with how each participant on the call has chosen that their emergency information may be made available and to whom it may be made available. As to be understood herein, the emergency may be a medical emergency, a law enforcement emergency, a fire department emergency or any other sort of emergency.

As stated above, another advantage of the present system is that each of the participants choose their own emergency settings and preferences and may specify their approved first responders based on factors they choose. As such, one participant may choose "notify the local police or ambulance if I'm in Poland or the US, but do not notify the local police if I'm in Russia". Another participant may choose "notify my corporate boss and call the local police", etc.

In optional aspects, the participant witnessing the emergency may choose to activate a system that displays the victim's unique token on screen such that the witness may simply call their local police or ambulance service and read the token number to them. Alternatively, the victim's unique token may be transmitted over a network to the first responder's computer system. It is to be understood that the present system encompasses both methods of contacting the first responder.

In exemplary aspects, the emergency information contains at least one of: a physical location of the first participant, an Internet Protocol (IP) address of a computer or a smart device (e.g. a communication device) associated with the first participant, medical or insurance information of the first participant, contact information of the first participant, or contact information of emergency contacts selected by the first participant, other data that particular user decided to share The unique token may be automatically deleted after the end of the video communication. As such, a unique token may be generated for every single video communication for each of the participants using the present system. This approach further enhances system security as tokens need not be reused.

In other optional aspects, the chosen (i.e.: appropriate) first responder may be able to contact the first participant (i.e.: the victim), or the second participant (i.e.: the witness) through the present computer systems and networks. In various aspects, contacting the victim may further entail the first responder accessing security settings on the victim's camera to disable any blurring or virtual backgrounds.

In other aspects, the present system includes a method of alerting a first responder that an emergency has occurred during a video communication between two or more participants, the method comprising: preparing and sending emergency information over a network to a trusted custodian computer system, wherein the emergency information is associated with a first participant to a video communication and is prepared and sent by the first participant to the trusted custodian computer system prior to commencement of the video communication; receiving, at the trusted custodian computer system, the emergency information; generating, at the trusted custodian computer system, a unique token corresponding to the received emergency information; assigning the unique token to the first participant prior to the commencement of the video communication; transmitting the unique token from a second participant of the video communication to a first responder computer system associated with a first responder when the second participant has witnessed that an emergency has occurred to the first participant during the video communication; transmitting the unique token from the first responder computer system associated with the first responder to the trusted custodian computer system; and determining when the first responder presenting the unique token to the trusted custodian computer system is both capable of responding to an emergency and has previously been permitted by the first participant to respond to the emergency.

At this stage, one of two actions may optionally be taken, including: alerting the first responder to the emergency and granting access to the emergency information to the first responder when the first responder has first been determined to be both capable of responding to the emergency and permitted to respond to the emergency, or locating a second first responder that is determined to be both capable of responding to the emergency and permitted to respond to the emergency, and granting access to the emergency information to the second first responder. For security reasons, the second participant cannot access the first participant's emergency information from the unique token.

In further aspects, the second participant may transmit an image from a video screen associated with the first participant during the video communication to the first responder computer system associated with the first responder.

A first aspect of the present specification provides a method of alerting a first responder computer system associated with a first responder that an emergency has occurred during a video communication between two or more participant communication devices, the method comprising: preparing and sending emergency information over a network to a trusted custodian computer system, wherein the emergency information is associated with a first participant of a video communication, and is prepared and sent by a first participant communication device, associated with the first participant, to the trusted custodian computer system prior to commencement of the video communication; receiving, at the trusted custodian computer system, the emergency information; generating, at the trusted custodian computer system, a unique token corresponding to the emergency information; assigning the unique token to the first participant communication device prior to the commencement of the video communication; transmitting the unique token, from a second participant communication device, associated with a second participant of the video communication, to a first responder computer system associated with a first responder when the second participant has witnessed that an emergency has occurred to the first participant during the video communication; transmitting the unique token from the first responder computer system associated with the first responder to the trusted custodian computer system; and determining, at the trusted custodian computer system, that the first responder presenting the unique token to the trusted custodian computer system is both capable of responding to an emergency and has been permitted by the first participant to respond to the emergency, and then one or more of: granting access to the emergency information to the first responder computer system when the first responder has first been determined to be both capable of responding to the emergency and permitted to respond to the emergency, and locating a second first responder that is determined to be both capable of responding to the emergency and permitted to respond to the emergency, and alerting the second first responder to the emergency and granting access to the emergency information to a second first responder computer system associated with the second first responder, wherein the second participant communication device cannot access the emergency information from the unique token.

A second aspect of the present specification provides a system for alerting a first responder computer system associated with a first responder that an emergency has occurred during a video communication between two or more participants, the system comprising: a trusted custodian computer system, comprising: a first computing device configured to receive emergency information from at least a first participant communication device associated with a first participant in a video communication prior to commencement of the video communication, a second computing device configured to generate a unique token corresponding to the emergency information and to assign the unique token to the first participant communication device prior to commencement of the video communication, a third computing device configured to determine when a first responder computer system presenting the unique token to the trusted custodian computer system corresponds to a first responder that is both capable of responding to an emergency and has been permitted by the first participant to respond to the emergency, a fourth computing device configured to grant access to the emergency information to the first responder computer system associated with the first responder when the first responder has first been determined by the third computing device to be both capable of responding to the emergency and permitted to respond to the emergency; and a fifth computing device comprising a video communication system configured to permit a second participant communication device, associated with a second participant who has witnessed the first participant have the emergency, to transmit the unique token via a network to the first responder computer system associated with the first responder, wherein the second participant communication device cannot access the emergency information from the unique token.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Figure 1:
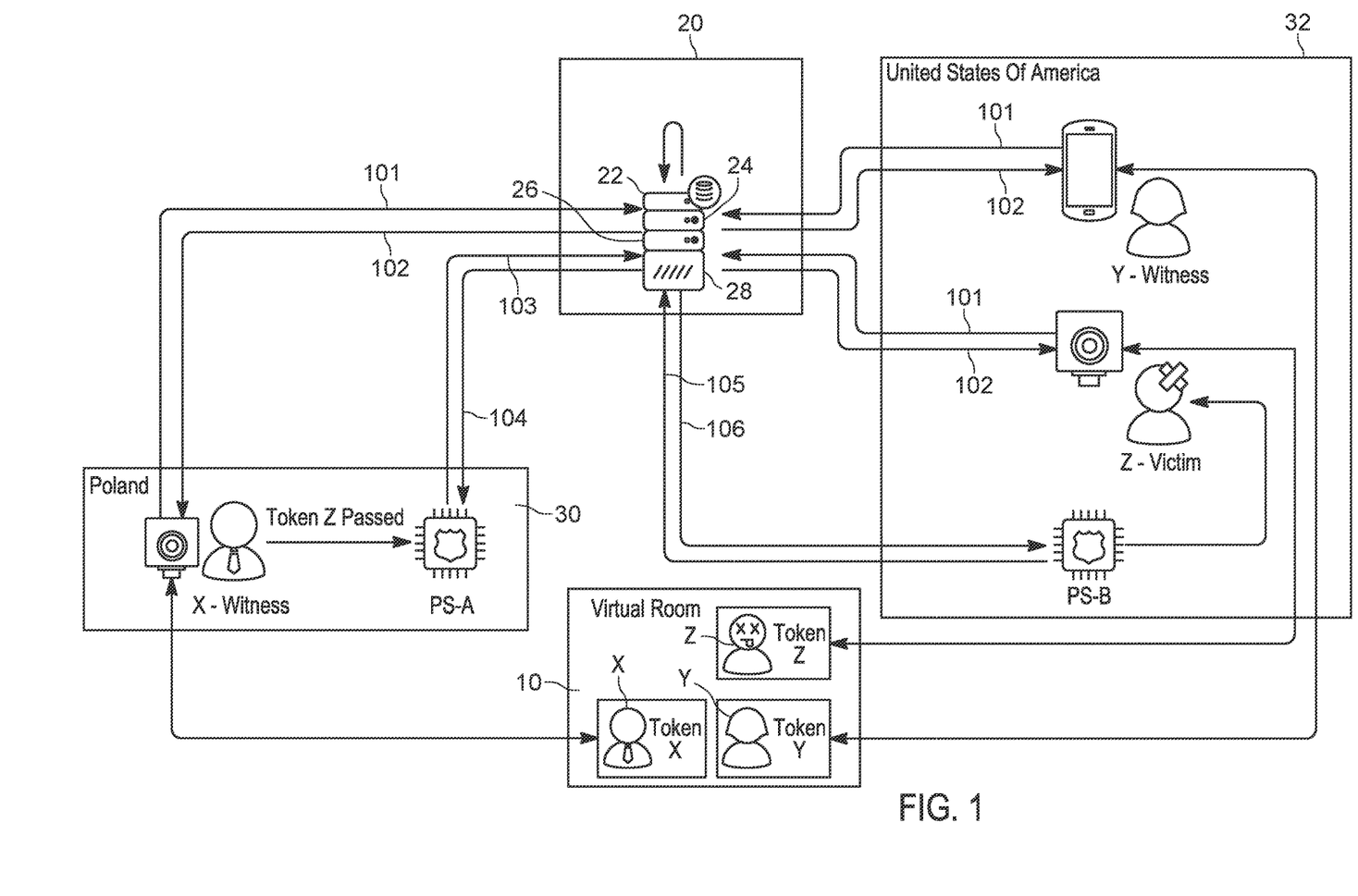
FIG. 1 is an illustration of the components of the present rescue system for accidents and events during video meetings.

FIG. 1 is an illustration of the components of the present system in which participants X, Y and Z all communicate together in a virtual room 10. Virtual room 10 in which the video communication is carried out may, for example, be a Zoom®, Skype®, Teams® or Facetime® call, or any other suitable video communication format. Moreover, it is to be understood that the video communication may be any one of a video conference, a video meeting, a social media livestreaming event, or a virtual reality experience. The present system is understood to encompass all of these possible options and computer-based systems for video communication.

In the illustrated example, witness participant X and public Services Agency PS-A are both located in a first location 30 (here, Poland), witness participant Y, victim participant Z and Public Services Agency PS-B are all located in a second location 32 (here, the United States). Trusted custodian computer system 20 may also be located in the United States or other location and virtual room 10 may be located in cyberspace.

In the illustrated example, participant Z has an emergency during the video call. For example, participant Z has a heart attack and slumps forward during the call. Participants X and Y who are also on the video call note that participant Z is in distress, and wish to immediately send a first responder to participant Z's location. This is further complicated by that (in this particular illustrated example), participant X is in a first location 30 (e.g.: Poland) and participants Y and Z are both located in a second location 32 (e.g.: the United States). Locating and sending an appropriate first responder to victim participant Z is accomplished by the present computer and communication system as follows.

A trusted custodian computer system 20 is provided. As will be fully explained herein, trusted custodian computer system 20 optionally performs several functions. First, it receives emergency information from each of the call participants X, Y and Z prior to the start of the video call. For example, each of participants X, Y and Z may push their personal data to trusted custodian computer system 20 at respective actions 101. Trusted custodian computer system 20 then generates and assigns unique security tokens to each of the participants X, Y and Z at actions 102. It is to be understood that a unique token may be assigned to each participant prior to every video call. As such, security tokens may not be re-used. Second, trusted custodian computer system 20 securely stores all of the emergency information it has previously received from participants X, Y and Z. The emergency information received from each of the participants is stored in a secure format such that it is not accessible to the other participants (or to any unauthorized people or entities). Such storage of the emergency information may be stored in computer memory, or in various webservices, etc. without limitation. Third, as will be explained herein, trusted custodian computer system 20 is configured to receive the unique tokens from first responders (e.g.: from PS-A at 103) and then determine when the first responder sending the token is both authorized and capable of responding to the emergency. If the first responder is found to be both authorized and capable of responding to the emergency, then the victim participant's emergency information (e.g.: the victim Z's participant's exact location) is sent to the first responder's computer system at 104 such that the first responder may assist the victim. However, should the first responder PS-A sending the token be determined not be capable or authorized to respond to the victim's emergency, (for example, the first responder sending the unique token is located in a different city than the victim), then trusted custodian computer system 20 is configured to locate an appropriate second emergency/first responder (for example, one who is in the same city as the victim, here PS-B) and then send the second first responder the victim participant's emergency information (e.g.: the victim's exact location) at 106 (after previously receiving data associated with Public Service Agency PS-B's capabilities and location at 105). This is all accomplished by trusted custodian computer system 20 as follows.

In exemplary aspects, trusted custodian computer system 20 comprises each of the following computing devices. A first computer system 22 is configured to receive emergency information from at least a first participant's computer system in a video communication prior to commencement of the video communication. In some examples, the first computing device 22 receives emergency information from all of the participants' computer systems to the video call prior to commencement of the video call. A second computing device 24 is configured to generate a unique token corresponding to the received emergency information and to assign the unique token to the first participant prior to commencement of the video communication; in some examples, the unique token may be stored in a suitable memory and/or database, such as an Additional Data Repository (ADR) of the National Emergency Number Association (NENA) Standard. A third computing and communicating device 26 is configured to determine when a first responder presenting the unique token to the trusted custodian computer system 20 is both capable of responding to an emergency and has actually been permitted by the first participant to respond to the emergency. A fourth computing and communicating device 28 is configured to grant access to the emergency information to a first responder computer system associated with the first responder when the first responder has first been determined to be both capable of responding to the emergency and permitted to respond to the emergency.

In various aspects, the computer system 22 that is configured to receive emergency information is configured to receive emergency information from a plurality of the participants in the video communication. In this example, participants X, Y and Z all send their emergency information to the computer system 22 prior to starting the video call. It is to be understood, however, that these participants may pre-store their emergency information and direct how it is to be used and distributed as part of their security settings and preferences with the trusted custodian computer system 20. As such, it is not necessary for the participants to store this emergency information prior to every single video call. As stated above, computing device 24 is configured to generate a unique token for each of the plurality of the participants in the video communication. In some examples, a unique token is generated prior to every single video call such that tokens are not re-used. This further enhances system security. As such, each participant X, Y and Z may only need to store their emergency information once while the computing device 24 generates a unique token for every single video call the participants make. In the case of a corporate network system, the emergency information that is stored may be pre-defined and standardized by the corporate entity. In addition, such default or standardized rules can be pre-defined at a jurisdictional level (such as a state or national level). As such, a company may require that all of their participants have the same emergency settings and that preferences be standardized.

As stated above, computing and communicating device 26 is configured to determine when a first responder presenting the unique token to the trusted custodian computer system 20 is both capable of responding to an emergency and has first been permitted by the first participant to respond to the emergency. This is accomplished when a first responder (e.g.: illustrated Public Services Agency "PS-A" in the first location 30 (e.g. Poland)) sends the unique token to computing device 26. At this time, trusted custodian computer system 20 may determine that victim Z is located in the second location 32 (based on the emergency information previously submitted by participant Z prior to the video call). As such, computing and communicating device 26 may instead select an alternate or second first responder (e.g.: Public Services Agency "PS-B" located in the second location 32 (e.g. the United States)) who is both capable or responding and authorized to respond. Public Services Agency PS-B located in the United States may then be sent to assist victim Z and be given access to victim Z's emergency information (for example, their exact location and medical history in the case of a heart attack). As such, one aspect of the present system is its ability to locate an appropriate first responder in the same geographic area or jurisdiction as the victim participant on the video call. Optionally, the first responder may transmit emergency incident information to the trusted custodian computer system 20 that is then sent to a second first emergency responder computer. Such emergency incident information may include information known to the first emergency responder that would be of assistance to the second emergency responder if the second first responder is determined to be the appropriate first responder to respond to the emergency.

The system illustrated in FIG. 1 may operate as follows. First, prior to commencing the video communication, each of participants X, Y and Z has sent their emergency information to computer system 22 in trusted custodian computer system 20 at actions 101. This emergency information optionally contains at least one of: a physical location of the first participant, an Internet Protocol (IP) address of a computer or a smart device (e.g. a communication device) associated with the first participant, medical or insurance information of the first participant, contact information of the first participant, or contact information of emergency contacts selected by the first participant. The participants' act of sending their emergency information to trusted custodian computer system 20 is treated as a request for a unique token to be assigned to each of the participants. Accordingly, computer device 24 then generates and sends a unique token to each of participants X, Y and Z at actions 102. In some examples, a unique token may be generated for each participant for each video communication (such that tokens are never reused). Assuming the video call (viewed by the three illustrated participants X, Y and Z in virtual room 10) goes well and that no emergency occurs, the call later terminates and the unique tokens for the three participants are automatically deleted or destroyed at the end of the video call or shortly after the end of the call. This ensures that no active security tokens remain live after the call, further adding to overall system security.

However, in the event that participant Z has a medical emergency during the video call, the following illustrated actions are taken instead. Participant X is the first (and maybe only) witness to participant Z being a victim of a medical emergency. Unfortunately, participant witness X is in a first location 30 (e.g.: Poland) and participant victim Z is in a second location 32 (e.g.: the United States). In accordance with the present system, an appropriate first responder who is able to assist victim Z with the emergency may be quickly located as follows.

As seen in virtual room 10, witness X is able to view victim Z's security token, (which, in some examples, may comprise a series of numbers or letters in an alphanumeric string that has no inherent meaning to witness X) on screen. Witness X uses their computer system, (which may be associated with their video communication system) to send Z's security token to the computer system of local first responder PS-A in Poland. Ideally, this security token is sent over the present network directly to a computer system operated by the first responder PS-A in Poland. It is to be understood, however, that the present system also includes the option of witness X simply calling their local first responder PS-A and simply reading off Z's displayed security token alphanumeric string over the phone (as seen in virtual room 10). As such, if witness X sees victim Z have a heart attack, and does not know where victim Z is located, witness X may simply contact their local ambulance service PS-A. The present system then quickly determines whether a Polish ambulance (PS-A) is an appropriate first responder that is able to assist victim Z.

The security token is received by computing device 26 in trusted custodian computer system 20. Trusted custodian computer system 20 has stored therein the emergency information for victim Z. This emergency information would include the location of victim Z (e.g.: victim Z's residential or business address). Computing device 28 uses victim Z's emergency information to determine when PS-A is the appropriate first responder for victim Z's condition. In this example, computing device 28 determines that the Polish ambulance PS-A and the victim Z are in two different countries (i.e.: first and second locations 30 and 32, respectively). As such, computing device 28 may instead find an American ambulance service PS-B that is local to victim Z. The local American ambulance PS-B may then be sent to assist victim Z. In addition, at this time, computing device 28 may grant access to victim Z's emergency information to American ambulance service PS-B. One benefit of the present system is that although such emergency information may only include victim Z's address, the present system enables the storage and use of much more emergency information. For example, victim Z could have chosen to have included his/her medical and healthcare insurance information in their emergency information. As such, this medical and healthcare insurance information may be relayed to American ambulance PS-B prior to their arrival on the scene.

As mentioned above, action 106 of granting access to the emergency information to a first responder computer system associated with the first responder may only occur when the first responder has first been determined to be capable of responding to the emergency and also has been previously permitted by victim Z by to respond to the emergency. This opens up many cross-jurisdictional advantages. For example, participant Z may have set their preferences in their emergency information to "notify the local police if I'm in the US, Poland, Canada or the UK, but do not notify the local police if I'm in Russia". In other aspects, the computer system operating virtual room 10 is configured to permit witness X to activate an onscreen display of the unique token (such that witness X may simply call their local first responder and read them the token's alphanumeric string).

In other aspects, once the appropriate first responder PS-B has been located and sent victim Z's emergency information, the present video communication system operating virtual room 10 further permits first responder PS-B to communicate directly with one or both of the victim Z and the witness X. Specifically, the first responder computer system associated with first responder PS-B may optionally be enabled to contact one or both of: a computer or a smart device (e.g. a communication device) associated with victim participant Z, or a computer or a smart device (e.g. a communication device) associated with witness participant X.

As stated above, the first responder PS-B may be enabled to communicate directly with witness X. This may be very advantageous in that in the illustrated example, American ambulance PS-B may speak with witness X during the time in which American ambulance PS-B is rushing to the scene of victim Z's emergency. At this time, witness X may give valuable information as to victim Z's behavior prior to the emergency.

Also, in the case of a law enforcement emergency (as opposed to a medical emergency), the police (PS-B in this case) may wish to interview witness X as to exactly what witness X saw occurring on victim Z's screen prior to and during the emergency. Ideally, it would be possible for the police PS-B to also contact participant Y to the video call (to have an additional witness to the emergency).

In further aspects, the present video communication system permits the first responder to access security settings on a camera associated with victim Z thereby disabling any blurring or virtual backgrounds used by victim Z. It is to be understood that this level of access to victim Z's computer system should first be preapproved by participant Z when she/he first submits her/his emergency information and permission settings. Nevertheless, this level of access to victim Z's camera (and microphone/speakers) may be of great assistance to first responder PS-B. For example, American ambulance PS-B could see the victim Z and his/her immediate surroundings prior to reaching the victim. In another example, a fire service PS-B could view victim Z's immediate surroundings in a building if the building were on fire.

The present system and network for communication between the trusted custodian computer system 20, the video communication system operating virtual room 10 and the computer systems associated with the emergency responders PS-A and PS-B may include one or more wired and/or wireless input/output (I/O) interfaces that are configurable to communicate with other components of the system. For example, this may include one or more wired and/or wireless transceivers that are adapted for communication with one or more communication links and/or communication networks used to communicate with the other components of the system.

Figure 2:
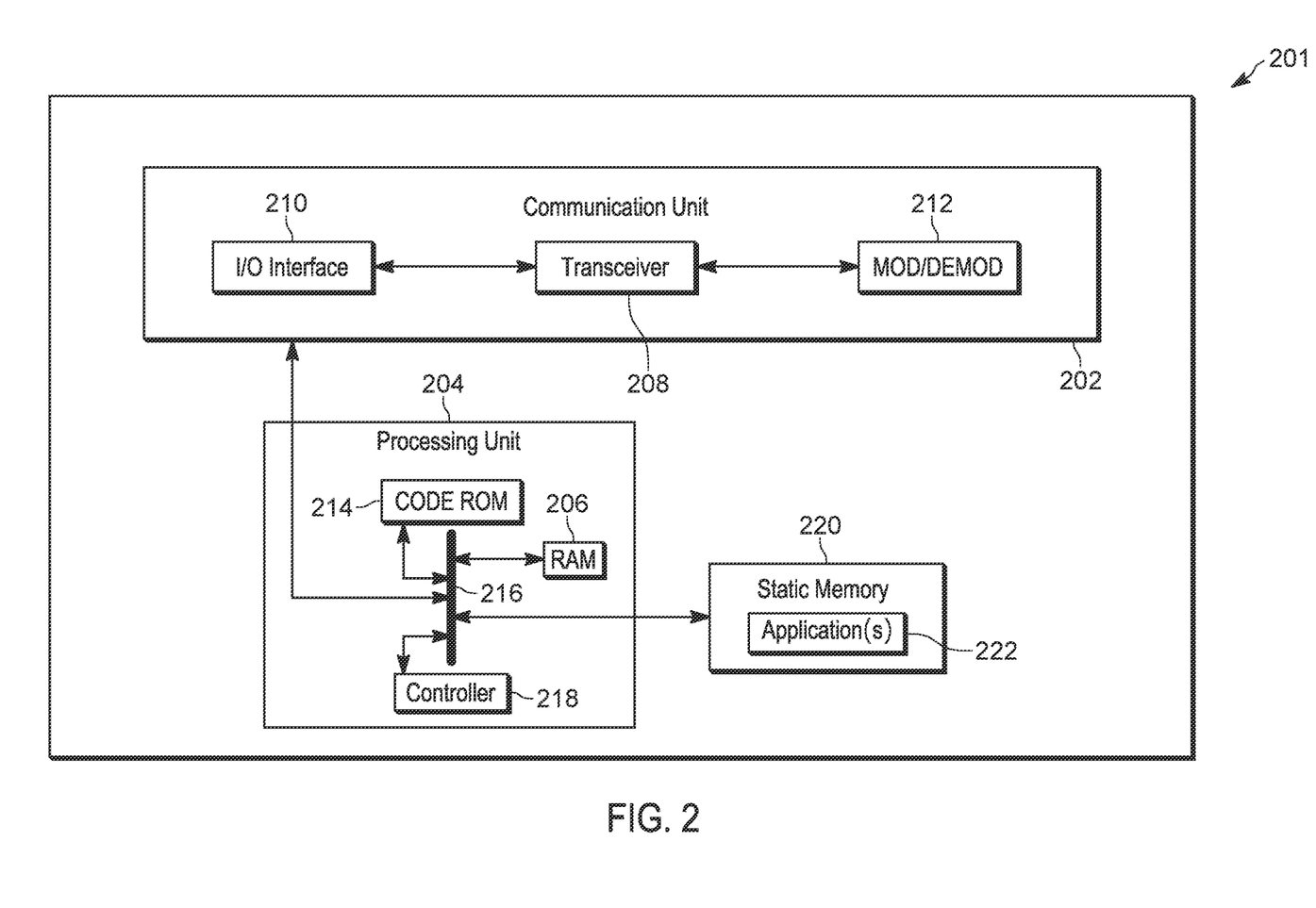
FIG. 2 is a device diagram showing a device structure of a communication device for rescuing victims of accidents and emergencies during video meetings.

Specifically, FIG. 2 shows a device structure of a computing device 201 for rescuing victims of accidents and emergencies during video meetings, as follows. Computing device 201 may optionally correspond to computing and communication device 28 in FIG. 1, which permits communication between trusted custodian computer system 20 and the computer systems of Public Services Agencies PS-A and PS-B. While computing device 201 is depicted in FIG. 2 as a single component, functionality of computing device 201 may be distributed among a plurality of components, such as a plurality of servers and/or cloud computing devices. The computing device 201 comprises a communications unit 202, a processing unit 204, a Random-Access Memory (RAM) 206, one or more wireless transceivers 208, one or more wired and/or wireless input/output (I/O) interfaces 210, a combined modulator/demodulator 212, a code Read Only Memory (ROM) 214, a common data and address bus 216, a controller 2018, and a static memory 220 storing at least one application 222. The controller 218 is understood to be communicatively connected to other components of computing device 201 via the common data and address bus 216. Furthermore, the memories 206 and 214 are depicted as having a particular structure and/or configuration, (e.g. separate RAM 206 and ROM 214), memory of the computing device 201 may have any suitable structure and/or configuration. Computing device 201 may also include an input device or display screen communicatively coupled to controller 218. Communication unit 202 may be communicatively coupled to the common data and address bus 216 of the processing unit 204. The processing unit 204 may include code Read Only Memory (ROM) 214 coupled to the common data and address bus 216 for storing data and initializing system components. The processing unit 204 may further include the controller 218, coupled, by the common data and address bus 216, to the Random-Access Memory 206 and the static memory 220.

In various aspects, these transceivers may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

Figure 3:
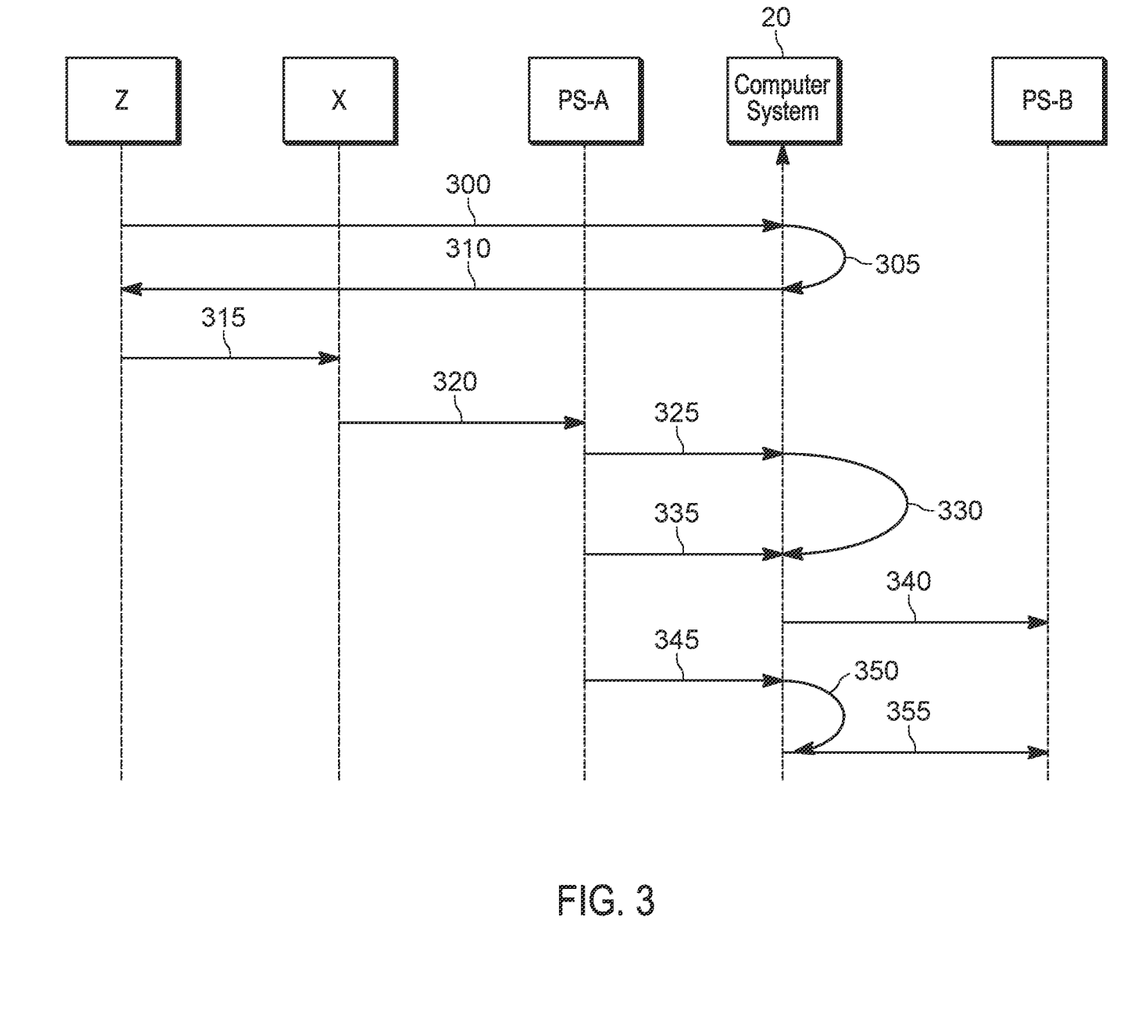
FIG. 3 is an illustration of communication flow according to a method of operation of the present rescue system for accidents and events during video meetings.

FIG. 3 is an illustration of communication flow according to one method of operation of the present system. At action 300, participant (and future victim) Z securely sends their emergency information to trusted custodian computer system 20. In some examples, participants X and Y also send their emergency information to trusted custodian computer system 20 as well. Next, trusted custodian computer system 20 securely stores the data at action 305. Next, at action 310 a unique token is generated at the trusted custodian computer system 20 and sent to participant Z. At action 315, witness participant X notices that participant Z is in distress (e.g.: having a heart attack, being in a building on fire, etc.). At this time, at action 320, witness X's computer system instructs the trusted custodian computer system 20 to send the unique token to a first responder (i.e.: public services agency PS-A, which may be a police department, fire department, ambulance, etc.). At action 325, first responder PS-A may then send the token to trusted custodian computer system 20. At action 330, trusted custodian computer system 20 runs an algorithm to determine who an appropriate emergency responder would be for victim Z's emergency. This decision may be based in part upon the emergency location in video participant Z's supplied emergency information. For example, when victim Z had supplied his/her address, then an appropriate police/fire/ambulance service would be sent from the same city or county. In addition to being close to the victim, the first responder needs to be the proper type of emergency service. (For example, PS-A may instead be a police department, but PS-B would need to be an ambulance service to respond to a medical emergency). In the illustrated example, trusted custodian computer system 20 quickly determined that PS-A was not an appropriate first responder (since in this example PS-A is located in Poland and victim Z is calling from an address in the United States). Accordingly, at action 335, PS-A is notified that it is not an approved/appropriate first responder for victim Z's emergency. At action 340, therefore, the trusted custodian computer system 20 contacts an appropriate emergency responder (PS-B who is local to victim Z).

In optional action, PS-A may optionally pass an incident description (received from witness X) on to trusted custodian computer system 20 at action 345 who then passes it on to appropriate first responder PS-B at action 355. At action 350, trusted custodian computer system 20 may extend the lifetime of the unique token at action 350. Extending the lifetime of the token has the advantage of permitting the selected first responder PS-B access the emergency information even after the end of the video communication (and, in some examples, for some time afterwards in the event that PS-B has a record of the video call). This is especially beneficial when PS-B is a police or medical agency who wishes to have follow-up communications with the witnesses or other participants on the call in the future.

The algorithms run by trusted custodian computer system 20 to locate an appropriate emergency responder may include machine-learning algorithms and/or deep learning algorithms and/or neural networks, including but not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some environments, such schools, prisons, and the like. Any suitable machine-learning algorithm and/or deep learning algorithm and/or neural network is within the scope of present examples.

Moreover, the present method may include trusted custodian computer system 20 using one or more machine-learning algorithms; and implementing a machine-learning feedback loop for training the one or more machine-learning algorithms, the machine-learning feedback loop comprising processing feedback indicative of selecting and communicating with first responders and video participants. Hence, by implementing a machine-learning feedback loop, more efficient operation of the computing device 201 may be achieved, and/or a change in operation of the computing device 201 may be achieved, as one or more machine-learning algorithms are trained to better and/or more efficiently select and communicate with first responders and video participants.

Figure 4:
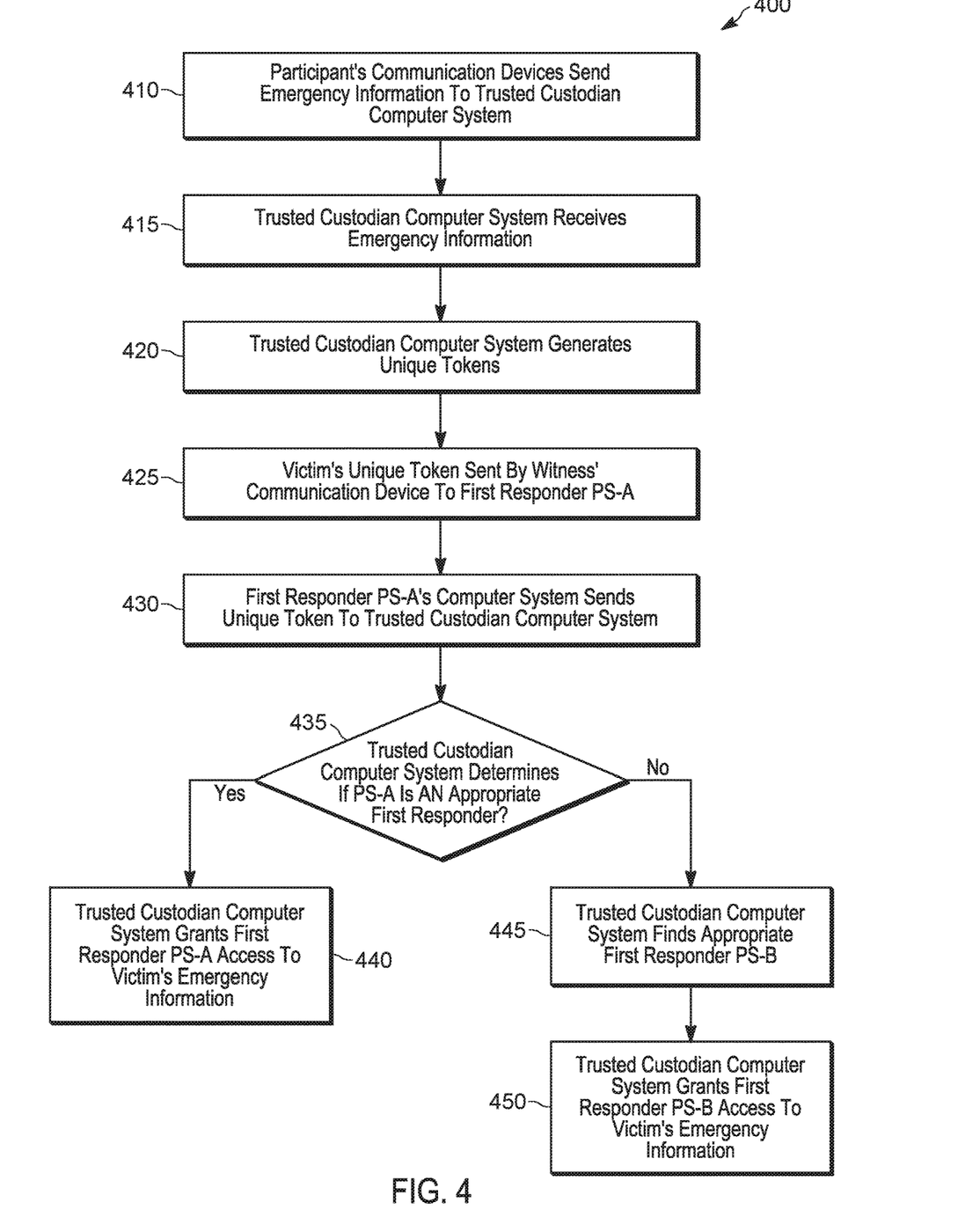

FIG. 4 is a flow chart illustrating a method 400 that may be implemented using the system of FIG. 1 and is described with respect to the system of FIG. 1.

First, at block 410, at least one, (e.g. and in some examples all) of the participants X, Y and Z's communication devices and/or computer systems prepare and send their emergency information over a network to a trusted custodian computer system 20 prior to commencement of the video communication among participants X, Y and Z. It is to be understood that these participant communication devices may send their emergency information at different times, and may each go back and edit the information they send. At block 415, the trusted custodian computer system 20 receives this emergency information and stores it securely such that the participants (and any other unauthorized third parties) do not have access to one another's information.

Next, at block 420, the trusted custodian computer system 20 generates unique security tokens for each of the participants who transmitted their emergency information to the trusted custodian computer system 20.

Video participants X, Y and Z then proceed to have their video call. During the call, video participant Z has an emergency (e.g.: suffers a heart attack). At this time, video participant X witnesses participant Z in distress. Accordingly, at block 425, video participant X (who is now the witness to the emergency) communicates with trusted custodian computer system 20 to instruct trusted custodian computer system 20 to send participant Z's (who is now the victim) unique token to a local first responder (Public Service Agency PS-A) (e.g. via an associated communication device).

At block 430, Public Service Agency PS-A computer system relays victim Z's unique token to the trusted custodian computer system 20. This is akin to the PS-A asking the trusted custodian computer system 20 whether the PS-A would be an appropriate first responder for responding to victim Z's emergency. PS-A needs to ask the trusted custodian computer system 20 to make this determination since (at this time) all the information PS-A has is the token number for victim Z's emergency (e.g. the token may comprise an alphanumeric string). Accordingly, at block 435, the trusted custodian computer system 20 makes this determination. To make this determination, the trusted custodian computer system 20 may process one or both of the nature of the emergency and the location of the emergency.

If PS-A is determined to be an appropriate emergency responder, (e.g.: victim Z is having a heart attack in Boston and PS-A is an ambulance service in Boston), then the present system proceeds to block 440 at which the trusted custodian computer system 20 grants PS-A access to victim Z's emergency information, (which may include victim Z's exact location and optionally Z's medical and healthcare insurance information as well).

Conversely, when PS-A is determined not to be an appropriate first responder, (e.g.: victim Z is having a fire in Boston and PS-A is an ambulance service in Poland), then the present system proceeds to block 445 at which the trusted custodian computer system 20 instead locates another emergency responder who is both capable and permitted to respond. For example, PS-B would be a fire truck station in Boston). At the same time, trusted custodian computer system 20 would grant emergency responder PS-B access to victim Z's emergency information at block 450. As stated above, the witness X (and the other participant Y) cannot access the first participant's emergency information from the unique token. As such, victim Z's privacy is maintained. In some examples, the blocks 445, 450 may be performed when PS-A is determined to be an appropriate first responder, for example in the event that PS-A declines (e.g. via a respective computer system) to access victim Z's emergency information. One or more of block 440, and the combination of blocks 445, 450, may occur.

In optional aspects, the witness X is able to transmit victim Z's unique token by over a network to a first responder computer system associated with emergency responder PS-A. However, the present method and system also includes the possibility that witness X simply calls first responder PS-A and tells them the unique token number over the phone.

Optional aspects of the present method may include automatically deleting the unique token after the termination of the video communication (for example when no emergency happens during the call), or extending the life of the token such that the appropriate emergency responder is able to contact one or more of the victim Z, the witness X or the other participant(s) Y on the call. As such, the appropriate emergency responder PS-B may contact these various individuals through their communication devices (e.g. computers or smart devices).

In further optional aspects of the present method, the first responder who has been selected/approved to respond to victim Z's emergency may also access security settings on a camera associated with the victim, thereby disabling any blurring or virtual backgrounds such that the first responder is able to get a clearer picture of the situation victim Z is experiencing.

In further optional aspects, the witness X is able to transmit an image from the video call screen (i.e.: an image from virtual room 10 in FIG. 1) to the selected emergency responder. This has the advantage of allowing the first responder PS-B view what has occurred or is occurring during the video communication. In the event that first responder PS-B is a medical service, this may be very helpful in getting information about the patient/victim Z prior to emergency responder PS-B even appearing on the scene.

As stated above, the emergency information initially compiled and sent by the participants X, Y and Z to the trusted custodian computer system 20 may contain their physical locations. As such, this information may be used to determine the location of victim Z, such that an appropriate first responder PS-B may be located at sent to assist patient/victim Z. The emergency information may also contain the Internet Protocol (IP) address of a computer or a smart device (e.g. a communication device) associated with (each of) the participant(s). This has the advantage of permitting the selected emergency responder to directly contact victim Z, witness X or any other participant Y. Of course, each of participants X, Y and Z may have the option of determining whether they wish to receive such communications right when they initially set up their emergency information and associated security and contact preferences. In other aspects, the emergency response information may include medical or insurance information, (which may assist medical emergency responders). The emergency information may also include direct contact information for the various participants, or the contact information of emergency contacts selected and approved by the various participants. For example, participant Z may have included in his/her emergency information a request that his/her spouse or child be notified in the case of an emergency and a notification also be sent to his/her doctor if the emergency is a medical emergency.

One of the beneficial aspects of the present system is the flexibility it affords the various participants to the video communication. For example, the emergency information each participant sends to the trusted custodian computer system 20 may be set or modified by the participant's location (such that different rules and procedures are followed if the participant is in a different location or country). As such, different emergency contacts may be notified when the participant is in different locations. For example, "call my sister in Poland if the emergency occurs in Poland but call my brother in the United States if I'm in the United States during an emergency". Additionally, the participant may choose different procedures, rules and contact persons in different jurisdictions having different data protection laws. A participant may also select different procedures, rules and contact persons depending upon their citizenship or residency locations. Importantly, all of this emergency information may be set up and securely pre-stored in advance of the video communication. It is to be understood that the various participants are free to edit or revise this emergency information from time to time as desired, however, the participants are not required to set up and store this information in advance of every video call or communication they make. Rather, their emergency information may be pre-stored with the trusted custodian computer system 20, (which then generates a unique token for each participant for each call). As such, the participants are also may be given the option to configure their emergency information such that they are free to limit the amount and nature of personal information that is shared with the first responder depending upon the jurisdiction/identity of the emergency responder.

Lastly, a further optional aspect of the present system may include a victim fail-safe mechanism in which a participant is able to overrule and stop trusted custodian computer system 20 from locating a first responder when no emergency exists. For example, should participant Z disappear from camera for an extended period of time such that witness X believes an emergency has occurred and notifies a local emergency responder PS-A, but participant Z returns to the camera has all parties realize no emergency has actually occurred.

As should be apparent from this detailed description above, the operations and functions of the present system are sufficiently complex as to require their implementation on a computer system, and cannot be performed, as a practical matter, in the human mind. Electronic computing devices and networks such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot quickly alert appropriate emergency responders to assist a video call participant in distress, among other features and functions set forth herein).

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of alerting a first responder computer system associated with a first responder that an emergency has occurred during a video communication between two or more participant communication devices, the method comprising:
preparing and sending emergency information over a network to a trusted custodian computer system, wherein the emergency information is associated with a first participant of a video communication, and is prepared and sent by a first participant communication device, associated with the first participant, to the trusted custodian computer system prior to commencement of the video communication;
receiving, at the trusted custodian computer system, the emergency information;
generating, at the trusted custodian computer system, a unique token corresponding to the emergency information; assigning the unique token to the first participant communication device prior to the commencement of the video communication;
transmitting the unique token, from a second participant communication device, associated with a second participant of the video communication, to a first responder computer system associated with a first responder when the second participant has witnessed that an emergency has occurred to the first participant during the video communication; transmitting the unique token from the first responder computer system associated with the first responder to the trusted custodian computer system; and
determining, at the trusted custodian computer system, that the first responder presenting the unique token to the trusted custodian computer system is both capable of responding to an emergency and has been permitted by the first participant to respond to the emergency;
granting access to the emergency information to the first responder computer system when the first responder has first been determined to be both capable of responding to the emergency and permitted to respond to the emergency; and
locating a second first responder that is determined to be both capable of responding to the emergency and permitted to respond to the emergency, and alerting the second first responder to the emergency and granting access to the emergency information to a second first responder computer system associated with the second first responder,
wherein the second participant communication device cannot access the emergency information from the unique token.

2. The method of claim 1, wherein a plurality of participant communication devices in the video communication, associated with respective participants, each prepares and sends respective emergency information, associated with a plurality of participants in the video communication, to the trusted custodian computer system and the trusted custodian computer system generates unique tokens for each of the plurality of participant communication devices prior to the video communication, the method further comprising:
in response to receiving an indication, from one or more of the plurality of participant communication devices, that any of the respective participants have witnessed a respective emergency occurring with any of other participants, transmitting a respective unique token for a respective participant having the respective emergency to the first responder computer system associated with the first responder.

3. The method of claim 1, further comprising:
selecting at the trusted custodian computer system, the first responder or the second first responder on a basis of the first responder or the second first responder being in a same geographic area or jurisdiction as the first participant.

4. The method of claim 1, further comprising:
automatically deleting the unique token after a termination of the video communication or after predefined time after termination of the video communication.

5. The method of claim 1, further comprising:
a respective communication device of the first responder or the second first responder contacting at least one of: the first participant communication device and the second participant communication device.

6. The method of claim 5, further comprising:
the respective communication device of the first responder or the second first responder accessing security video settings associated with the first participant, thereby disabling blurring or virtual backgrounds.

7. The method of claim 1, wherein preparing and sending emergency information to the trusted custodian computer system comprises:
selecting different emergency information based upon an identity or a jurisdiction of the first responder.

8. The method of claim 1, further comprising:
the second participant communication device transmitting an image from a video screen associated with the first participant during the video communication to the first responder computer system associated with the first responder.

9. The method of claim 1, further comprising:
the first emergency responder transmitting emergency incident information to the trusted custodian computer system; and
the trusted custodian computer system then transmitting the emergency incident information to the second first emergency responder.

10. The method of claim 1, wherein the emergency information contains at least one of:
a physical location of the first participant,
an Internet Protocol (IP) address of the first participant communication device,
medical or insurance information of the first participant,
contact information of the first participant, or
contact information of emergency contacts selected by the first participant.

11. A system for alerting a first responder computer system associated with a first responder that an emergency has occurred during a video communication between two or more participants, the system comprising:

a trusted custodian computer system, comprising:
- a first computing device configured to receive emergency information from at least a first participant communication device associated with a first participant in a video communication prior to commencement of the video communication,
- a second computing device configured to generate a unique token corresponding to the emergency information and to assign the unique token to the first participant communication device prior to commencement of the video communication,
- a third computing device configured to determine when a first responder computer system presenting the unique token to the trusted custodian computer system corresponds to a first responder that is both capable of responding to an emergency and has been permitted by the first participant to respond to the emergency,
- a fourth computing device configured to grant access to the emergency information to the first responder computer system associated with the first responder when the first responder has first been determined by the third computing device to be both capable of responding to the emergency and permitted to respond to the emergency; and
- a fifth computing device comprising a video communication system configured to permit a second participant communication device, associated with a second participant who has witnessed the first participant have the emergency, to transmit the unique token via a network to the first responder computer system associated with the first responder, wherein the second participant communication device cannot access the emergency information from the unique token.

12. The system of claim 11, wherein:
the first computing device is further configured to receive respective emergency information from a plurality of plurality of participant communication devices in the video communication, the plurality of plurality of participant communication devices associated with respective participants,
the second computing device is further configured to generate a unique token for the plurality of plurality of participant communication in the video communication, and
the fifth computing device is further configured to permit at least one of the plurality participant communication devices in the video communication to transmit a respective unique token of any participant experiencing an emergency.

13. The system of claim 11, wherein the first responder determined by the trusted custodian computer system to be capable of responding to the emergency is in a same geographic area or jurisdiction as the first participant.

14. The system of claim 11, wherein the fifth computing device, configured to permit the second participant communication device to transmit the unique token when the second participant has witnessed the first participant having the emergency, comprises a respective system for the second participant to activate an on screen display of the unique token.

15. The system of claim 11, wherein the video communication is a video conference, a video meeting, a social media livestreaming event, or a virtual reality experience.

16. The system of claim 11, wherein the trusted custodian computer system locates an emergency responder capable of responding to the emergency by determining a physical location of the first participant and selecting the first responder in a same geographic area or jurisdiction as the first participant.

17. The system of claim 11, wherein the emergency information contains at least one of:
- a physical location of the first participant,
- an Internet Protocol (IP) address of a computer or a smart device associated with the first participant,
- medical or insurance information of the first participant,
- contact information of the first participant, or
- contact information of emergency contacts selected by the first participant.

18. The system of claim 11, wherein the emergency is one of a medical emergency or a law enforcement emergency.

19. The system of claim 11, wherein the trusted custodian computer system is further configured to automatically delete the unique token after a termination of the video communication.

20. The system of claim 11, wherein the fifth computing device permits the first responder computer system associated with the first responder to contact at least one of:
- the first participant communication device, or
- the second participant communication device.

21. The system of claim 20, wherein the fifth computing device permits the first responder computer system to access security settings on a camera associated with the first participant communication device thereby disabling blurring or virtual backgrounds.

* * * * *